United States Patent
Luman et al.

(10) Patent No.: US 7,129,934 B2
(45) Date of Patent: Oct. 31, 2006

(54) COLLABORATIVE MARKUP PROJECTION SYSTEM

(75) Inventors: David Luman, Meridian, ID (US); David W. Magnuson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 512 days.

(21) Appl. No.: 10/355,799

(22) Filed: Jan. 31, 2003

(65) Prior Publication Data

US 2004/0150627 A1 Aug. 5, 2004

(51) Int. Cl.
*G09G 5/00* (2006.01)
(52) U.S. Cl. .................. 345/173; 345/179
(58) Field of Classification Search ............ 345/1.1, 345/156, 173–177, 179; 715/751, 753; 178/18.01–18.07, 178/19.01–19.05
See application file for complete search history.

(56) References Cited

U.S. PATENT DOCUMENTS

| | | | | | |
|---|---|---|---|---|---|
| 5,027,198 | A | * | 6/1991 | Yoshioka | 348/14.08 |
| 5,629,714 | A | * | 5/1997 | Nishitani et al. | 345/2.3 |
| 5,818,616 | A | * | 10/1998 | Kawai | 398/72 |
| 5,917,475 | A | * | 6/1999 | Kuzunuki et al. | 345/173 |
| 6,084,584 | A | * | 7/2000 | Nahi et al. | 715/864 |
| 6,128,014 | A | * | 10/2000 | Nakagawa et al. | 715/784 |
| 6,320,597 | B1 | * | 11/2001 | Ieperen | 345/629 |
| 6,930,673 | B1 | * | 8/2005 | Kaye et al. | 345/173 |
| 2002/0056577 | A1 | * | 5/2002 | Kaye et al. | 178/18.03 |
| 2002/0118180 | A1 | * | 8/2002 | Martin | 345/178 |

OTHER PUBLICATIONS

Nunamaker et al., Electronic Meeting Systems to Support Group Work, Jul. 1991, ACM, vol. 34, No. 7, pp. 41-61.*
Buckalew et al., The Lecturer's Assistant, 1994, ACM, pp. 193-197.*
Berque et al., Teaching Theory of Computation using Pen-Based Computer and an Electronic Whiteboard, 2001, ACM, pp. 169-172.*
Avaya Inc. website at http://wwwdb.avaya.com/pls/bcs/syst.main?p_id= 59&p_keyword= "Show Station IP," "View Station," and "Collaborative Video," copyright 2001, 6 pages, printed Mar. 22, 2002.
Numonics Corporation website at http://www.numonics.com/dpaindex.html, "DPA (The Digital Presentation Appliance)," "IPM (The Interactive Presentation Manager)," "Presentation Pro," "Podium Pro II," and IWB (The Interactive WhiteBoard), copyrights 2002, 5 pages, printed Jan. 30, 2003.
Promethean Limited website, "ACTIVboard Systems," at http://www.promethean.co.uk/products/Aboardsystems.htm, 3 pages, printed Jan. 30, 2003.
Promethean Limited website at http://www.promethean.co.uk/about_products/aboutwhiteboard.htm, "What is an Interactive Whiteboard?," 3 pages, printed Jan. 30, 2003.

* cited by examiner

*Primary Examiner*—Ricardo Osorio

(57) ABSTRACT

A system including a data projector and a plurality of touch-sensitive input tablets enables multiple participants to collaborate in the creation and marking up of a projected drawing or image. A data projector receives user markup data entered on various touch-sensitive tablets and projects the markup data onto a display surface as part of a collaborative drawing or image.

23 Claims, 7 Drawing Sheets

COLLABORATIVE MARKUP PROJECTION SYSTEM

TECHNICAL FIELD

The present disclosure relates to projection systems, and more particularly, to a projection system that enables a dispersed group of users to collaboratively mark up projected images.

BACKGROUND

Chalkboards and whiteboards with erasable markers for interactive discussions have widespread use in business and educational settings. Various electronic whiteboards provide for electronic recordation of markings such as figures, words and characters handwritten by a user onto the whiteboard for later printout, review, and/or transmission. Typical electronic whiteboards include a resistive membrane stretched over a rigid substrate, an electronics module for determining the position of an instrument such as a pen or stylus used to write on the whiteboard, and a computer for processing and storing the coordinates of the pen as it moves over the whiteboard.

Disadvantages with current whiteboards include the inability for participants dispersed throughout a room to provide handwritten input to a drawing being discussed and developed on a whiteboard. Therefore, participants who want to contribute to a drawing being developed on the whiteboard must crowd around the whiteboard in order to gain access and provide handwritten input. The problem of accessing the whiteboard is magnified as the setting gets larger, such as in a large conference room or lecture hall where a greater number of people want to share and collaborate on ideas. In addition, most whiteboards are simply not visible to people seated in the back rows of a large conference room or lecture hall. Another disadvantage with current whiteboards that are able to record handwritten input (e.g., electronic whiteboards) is that they are often bulky and difficult to transport due to the resistive membrane and rigid substrate typically used to sense handwritten input. This can create problems for a lecturer who travels to numerous locations to give interactive presentations. Yet another significant disadvantage with current whiteboards is that they do not provide the ability to mark up pre-existing drawings or images. Rather, the drawings on the whiteboard are developed from scratch.

Projection systems are also commonly used in business and educational settings for interactive discussions. Unlike electronic whiteboards, projection systems provide pre-existing images for interactive discussions. For example, data projectors are devices that accept image data from a computer and project images onto a screen or white wall. An advantage of data projectors is the ease with which hardcopies of a presentation can be printed and made available to participants. Another advantage with projectors in general is their ability to make projected images large enough to be visible to people seated in back rows of a large conference room or lecture hall.

Data projectors initially used only cathode ray tubes (CRT) to create an image which was magnified and projected. However, CRT data projectors are quite large and difficult to transport. Therefore, LCD (liquid crystal display) data projectors are now more commonly used. LCD projectors form an image on an LCD panel which is backlit by a very bright halogen lamp to illuminate the panel and project the image through a lens onto a screen or white wall. A significant advantage of an LCD data projector is that it can be very small and easy to transport.

A disadvantage of data projectors (e.g., an LCD projector) for collaborative purposes, is that they do not provide the ability for discussion participants to provide handwritten input to projected images. Therefore, interaction between a speaker and an audience is limited to verbal interaction. More recently, data projectors have been developed that include electronic white boards. Although projecting images onto a whiteboard permits handwritten input, the problem of having participants crowd around the whiteboard in order to provide handwritten input to an image remains. In addition, use of a whiteboard with a projector reduces the projected image size to the size of the whiteboard, and thus reduces visibility for people seated in the back rows of a large conference room or lecture hall. Furthermore, the illumination of an image onto a whiteboard often visually overpowers underlying markings made to a whiteboard. Thus, it is often difficult to see the handwritten input. In addition, although an electronic whiteboard permits the recordation of handwritten markings for later printout, review, and/or transmission, such markings are of little use if not combined with the originally projected image being marked up.

Accordingly, the need exists for an interactive projection system that permits numerous participants dispersed throughout a room, including a large conference room or lecture hall, to collaboratively generate and discuss drawings that can easily be recorded for printout, review, and/or transmission. The need also exists for such a system to provide pre-existing images that can be collaboratively marked up and recorded for printout, review, and/or transmission.

SUMMARY

A system including a data projector and a plurality of touch-sensitive input tablets enables multiple participants to collaborate in the creation and marking up of a projected drawing or image. A data projector receives user markup data entered on various touch-sensitive tablets and projects the markup data onto a display surface as part of a collaborative drawing or image.

BRIEF DESCRIPTION OF THE DRAWINGS

The same reference numbers are used throughout the drawings to reference like components and features.

DETAILED DESCRIPTION

A collaborative markup projection system includes a data projector and a plurality of touch-sensitive input/display tablets. The touch-sensitive tablets permit multiple users dispersed throughout a room to collaborate in creating a drawing or marking an image. The data projector can project a drawing or image, along with user markup data from a touch-sensitive tablet, onto a display surface for public display. In addition, the projector can send marked up drawings/images to the touch-sensitive input tablets for display on each tablet. The system may include a computer input device to provide a pre-existing image that multiple users can mark up using the touch-sensitive input tablets. Collaborative drawings and markup images can be printed, saved for review, and/or transmitted using a computer device coupled to the projection system.

Advantages of the disclosed collaborative markup projection system include a capability that allows a large number of people to participate and collaborate in the generation of drawings and in the marking up of pre-existing drawings or images.

Figure 1:
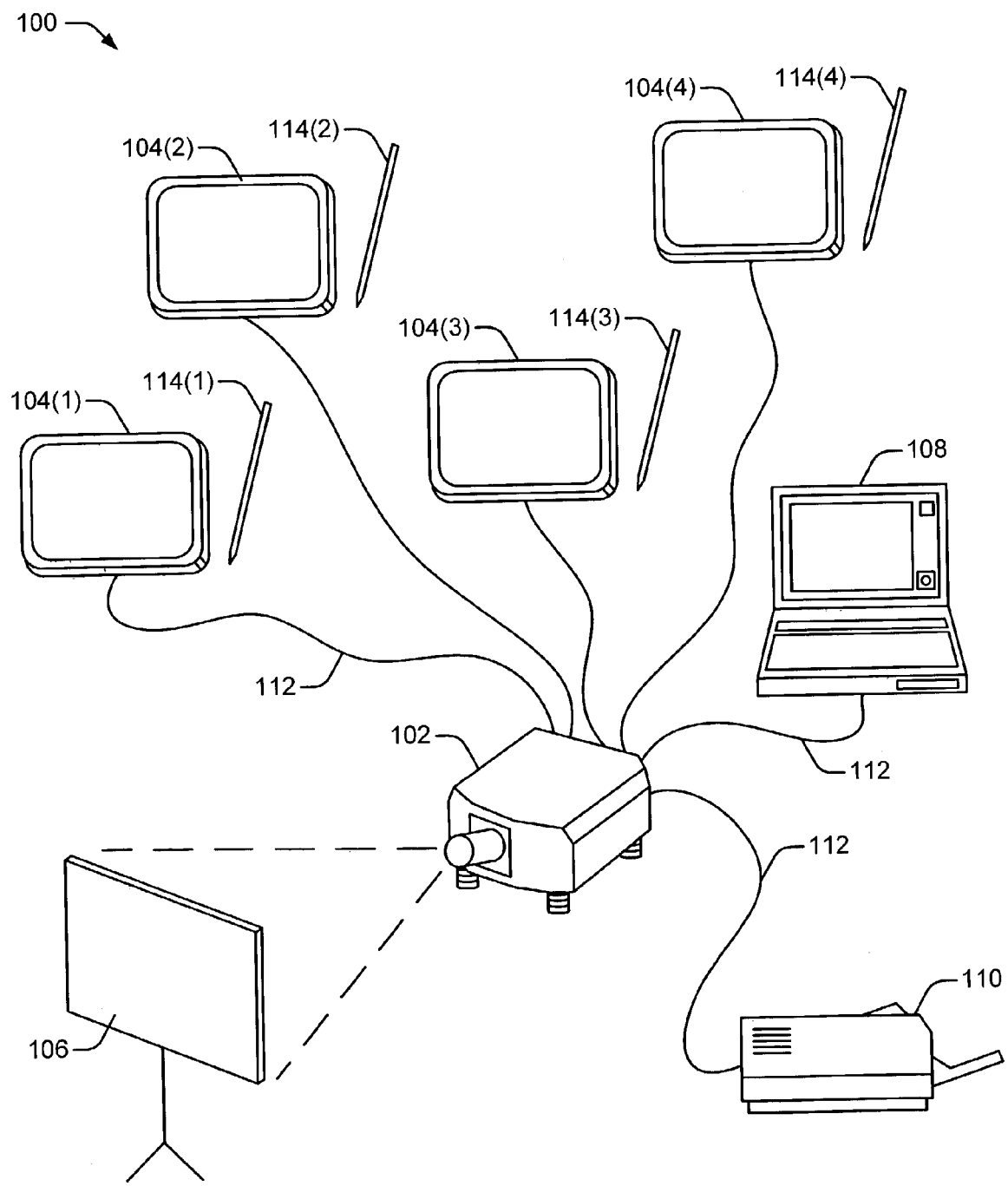
FIG. 1 illustrates a system environment that is suitable for implementing a collaborative markup projection system.
Figure 2:
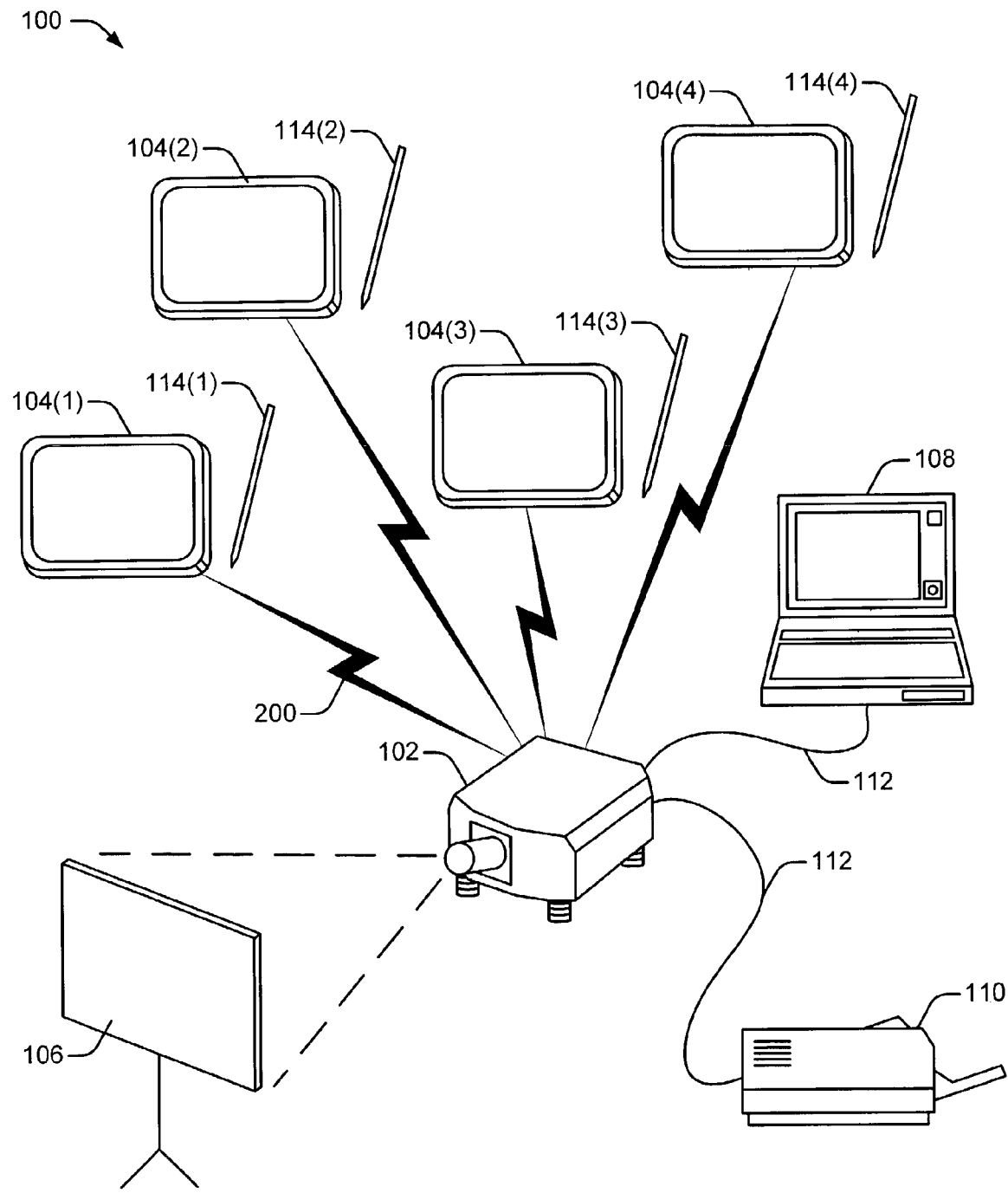
FIG. 2 illustrates an alternate system environment that is suitable for implementing a collaborative markup projection system.

Exemplary System Environment for Implementing a Collaborative Markup Projection System FIG. 1 illustrates an exemplary system environment that is suitable for implementing a collaborative markup projection system. The exemplary system environment 100 of FIG. 1 includes projector 102, a plurality of touch-sensitive user-input/display tablets 104, a public display surface 106, an input device 108, and a printer 110. Projector 102 is operatively coupled to touch-sensitive user-input/display tablets 104, input device 108, and printer 110 through local connections 112. Local connections 112 typically include hardwire interconnects such as computer and printer cables or some other suitable hardwire communications link. However, in another exemplary system environment as shown in FIG. 2, projector 102 may also be operatively coupled to touch-sensitive tablets 104 via wireless communications links 200. Wireless communication links 200 may include, for example, two-way RF (radio frequency) communications links.

Projector 102 is generally embodied as a data projector capable of accepting image data from an input device 108 and projecting an image onto a public display surface 106. Projector 102 may be a transmittive or reflective data projector. In reflective data projectors, an image is formed on a small, reflective chip. When light shines on the chip, the image is reflected off the chip through a lens and onto a public display surface 106. Thus, reflective data projectors operate by bouncing light off an image-forming element. Transmittive data projectors, however, operate by shining light through one of two image-forming elements. These two elements are CRT (cathode ray tube) elements and LCD (liquid crystal display) elements. CRT data projectors use one or more CRT tubes to form an image which is magnified and projected through a lens onto a public display surface 106. LCD data projectors form images on an LCD panel which is backlit by a very bright light (e.g., a halogen lamp) in order to project the image through a lens onto a public display surface 106.

LCD data projectors are more commonly used than CRT projectors due to their smaller size and increased resolution. Therefore, projector 102 is generally discussed herein as being embodied as an LCD data projector.

Public display surface 106 can be any flat surface reasonably capable of reflecting a projected image for viewing by a general audience. Thus, although the public display surface 106 is typically a white projector screen, it might also be, for example, a flat white wall.

The touch-sensitive user-input/display tablets 104 (hereinafter, touch-sensitive tablet 104) of FIG. 1 include at least a touch-sensitive input pad. However, touch-sensitive tablets 104 may also include a touch-sensitive input pad and a display screen integrated to form a touch-sensitive input/display screen. Each touch-sensitive tablet 104 also includes a stylus 114 for interfacing with the touch-sensitive tablet 104. Thus, a touch-sensitive tablet 104 enables a user to enter hand drawn markings (markup data) onto images and/or drawings, and in one embodiment, also displays images and/or drawings to the particular user of the touch-sensitive tablet 104.

Input device 108 can be implemented as a variety of general purpose computing devices including, for example, a personal computer (PC), a laptop computer, a palmtop computer, a Macintosh, a workstation computer, and other devices configured to communicate with projector 102 for the general purpose of sending and receiving image data. Input device 108 can also include other image-capable input devices such as a camera, a DVD (digital video disc) player, a digital television tuner, and a VCR (video cassette recorder).

Printer 110 can include various types of printing devices capable of rendering PDL (page description language) data in printed form on a print medium, such as printing pixels on paper. Therefore, printer 110 can include devices such as laser-based printers, ink-based printers, dot matrix printers, dry toner printers, plotters and the like. In addition, printer 110 can include various multi-function peripheral devices that combine a printing function with other functions such as faxing, scanning, copying and the like.

Exemplary Embodiments of a Collaborative Markup Projection System

Figure 3:
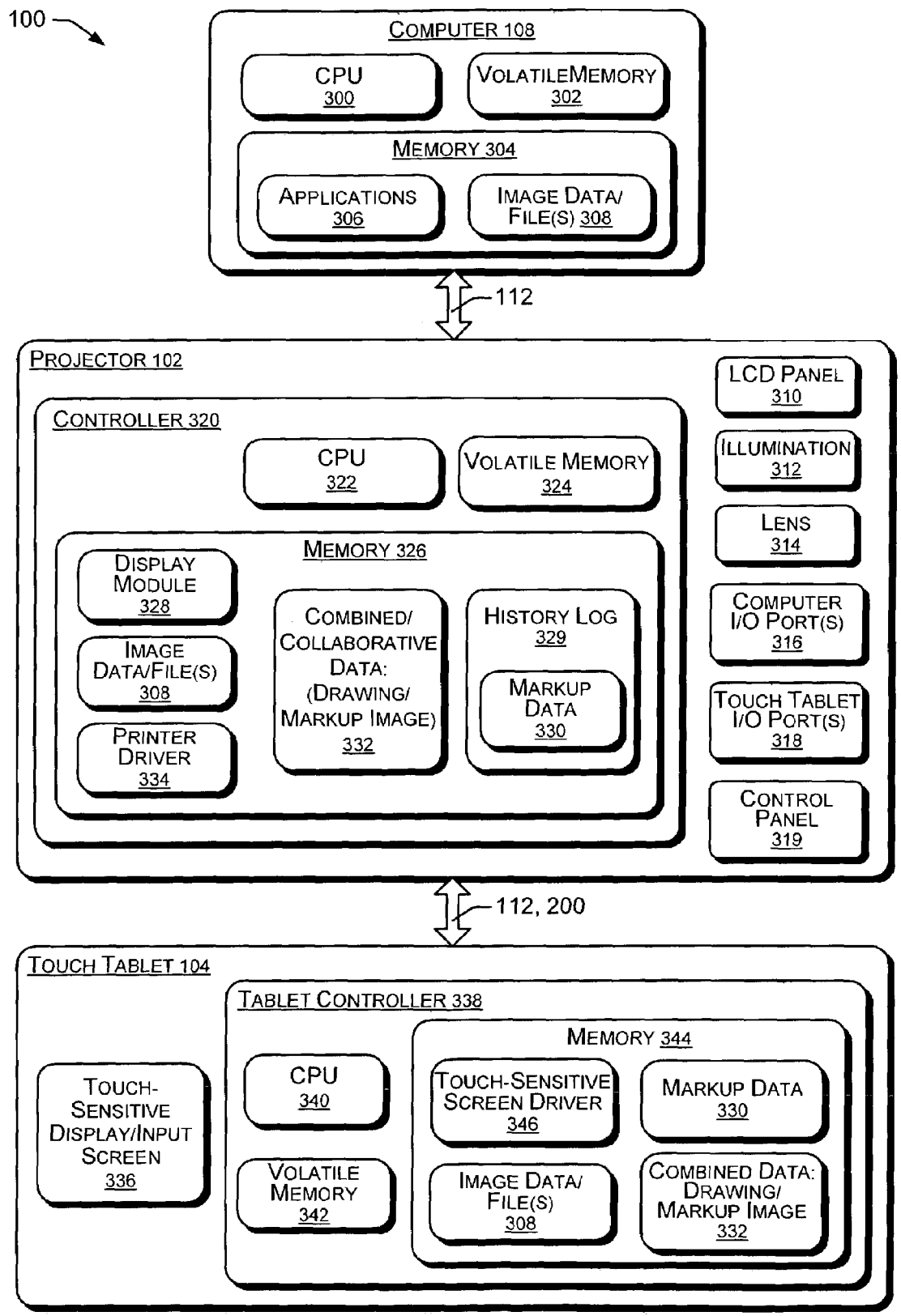
FIG. 3 is a block diagram illustrating in greater detail, an exemplary embodiment of an input device, a projector, and a touch-sensitive tablet as might be implemented in a collaborative markup projection system such as that shown in the system environments of FIGS. 1 and 2.

FIG. 3 is a block diagram illustrating example components that may be implemented in a collaborative markup projection system such as that shown in the system environments 100 of FIGS. 1 and 2. The components include an input device 108, a projector 102, and a touch-sensitive tablet 104. Various embodiments are described below with reference to the example system components of FIG. 3.

In FIG. 3, input device 108 is embodied as a computer 108. Computer 108 typically includes a processor 300, a volatile memory 302 (i.e., RAM), and a nonvolatile memory 304 (e.g., ROM, hard disk, floppy disk, CD-ROM, etc.). Nonvolatile memory 304 generally provides storage of computer/processor-readable instructions, data structures, program modules and other data for computer 108. Computer 108 may implement various application programs 306 stored in memory 304 and executable on processor 300 to generate or otherwise acquire an electronic image data file(s) 308 that is transferable to projector 102 for projection onto a public display surface 106.

Computer 108 is also generally configured to receive image information such as drawings/markup images 332 from projector 102 and to manipulate the drawings/markup images 332 for the purpose of having such images printed via a printer, reviewed via an appropriate application program 306, and/or transmitted to other similar computer devices as an attachment to an email or through some other appropriate file transfer protocol. Although FIGS. 1–3 do not illustrate computer 108 as being networked to achieve the transmission of image data to other similar computer devices or to a printer, this disclosure presumes that such computers 108 and other input devices 108 in general are commonly networked in such a manner, and, that such transmissions are commonplace and well-known.

Projector 102 is generally embodied as an LCD data projector configured to receive image data/file(s) 308 and user markup data 330, and to project images and user markup data onto a public display surface 106. As such, projector 102 includes an LCD panel 310 on which images are formed within projector 102 and illumination 312, such as a halogen lamp, for backlighting the LCD panel 310. Backlighting the LCD panel 310 with illumination 312 projects an image formed on LCD panel 310 through lens 314 and onto a public display surface 106. Projector 102 also includes computer (input device 108) I/O ports 316 to accommodate data transfer between projector 102 and a computer/input device 108. The illustration of projector 102 also includes touch tablet I/O ports 318 to accommodate data transfer between projector 102 and touch-sensitive user-input tablets 104 in a particular embodiment. Computer I/O ports 316 typically include, for example, two computer inputs (RGB1 and RGB2), one or two video inputs (composite video for VCR, component video for DVD), and an S-Video input for a document camera or other devices. With each video input there are corresponding audio inputs for the left and right channels, along with audio out and video out jacks to connect to other devices. Touch tablet I/O ports 318 may include composite video ports, component video ports, S-video ports, or any appropriately configured I/O port enabling the transfer of hand-drawn coordinate data between projector 102 and touch-sensitive user-input tablets 104. Projector 102 also has a control panel 319 that includes various input control buttons to facilitate functions of projector 102 such as image focusing, image brightness, and navigation between images.

Projector 102 also generally includes a controller 320 having a processor 322, a volatile memory 324 (i.e., RAM), and a nonvolatile memory 326. Nonvolatile memory 326 generally provides storage of computer/processor-readable instructions, data structures, program modules and other data for projector 102. Accordingly, memory 326 includes display module 328, image data/files 308, a history log 329 that includes user markup data 330, combined drawing/markup image data 332, and printer driver 334. Printer driver 334 is generally configured to convert image and/or drawing data being projected onto public display surface 106 into a printer-friendly format before the data is sent to a printer 110 for rendering as hardcopy output. The printer-friendly format is a PDL (page description language) such as PCL or PostScript that is suitable for the particular printer 110. Printer driver 334 usually executes when a print command or print button is selected on projector 102.

Display module 328 is configured to receive image data 308 from computer 108 and drawing or user markup data 330 from touch-sensitive tablet 104. Image data 308 is generally in a bit-map format, while drawing/markup data 330 is in an x-y coordinate data format. Display module 328 generally manipulates image data 308 and markup data 330 for projection onto public display surface 106. In addition, display module 328 may transfer image data 308 and user markup data 330 between projector 102, touch-sensitive tablets 104, and computer 108 as discussed below with respect to various embodiments.

History log 329 is configured to track incoming markup data 330 and store information on which touch-sensitive tablet 104 generates each mark stored in markup data 330. By tracking the markup data 300 from touch-sensitive tablets 104, history log 329 facilitates an information retrieval function of the touch-sensitive tablets 104 and a mark erasing function of the projector 102, as discussed in greater detail below. Markup data 330 is shown as being part of history log 329 for the purpose of illustrating this tracking association with history log 329. However, this illustration is not intended to indicate any limitation as to how any such data or modules might be stored within memory 326 of projector 102.

Touch-sensitive tablets 104 are configured with a touch-sensitive input screen 336 that, in a particular embodiment, also includes an integrated display screen. Thus, the screen 336 on touch tablet 104 may be a touch-sensitive input screen 336 in addition to being a display screen 336. Touch-sensitive tablets 104 also include a tablet controller 338. Controller 338 includes processor 340, a volatile memory 342 (i.e., RAM), and a nonvolatile memory 344. Nonvolatile memory 344 generally provides storage of computer/processor-readable instructions, data structures, program modules and other data for touch tablet 104. Accordingly, memory 344 includes touch-sensitive screen driver 346, image data/files 308, user markup data 330, and combined drawing/markup image data 332.

Touch-sensitive display/input screen 336 permits the entry of user markup data 330 entered by a user with a stylus 114 (FIGS. 1 and 2). In certain embodiments, touch-sensitive screen 336 may also display image and drawing data received from projector 102. Thus, users of multiple touch-sensitive tablets 104 dispersed throughout a room or lecture hall, for example, can view image and drawing data being projected onto a public display surface 106 by projector 102 while also viewing the same image and drawing data being displayed on their touch-sensitive tablet 104. Users can draw markings onto an image and/or other drawings/markings that are displayed on a touch-sensitive display/input screen 336 by dragging a stylus 114 (FIGS. 1 and 2) in a desired pattern across the screen 336. Projector 102 generally combines the user markup data 330 with an image data/file 308 and/or other markup data 330 and projects it as a markup image/drawing 332 onto a public display surface 106.

Touch-sensitive screen driver 346 records user markup data 330 entered through touch-sensitive screen 336 as x-y coordinate data. As a user drags a stylus 112 over touch-sensitive screen 336, driver 346 initiates a drawing event and begins recording x-y coordinates from the screen 336 that track the stylus 112 as it moves across the screen 336. The driver 346 sends the x-y coordinate markup data 330 to projector 102 where it is combined with other markup data 330 or image data 308 as combined data 332, which is then displayed on public display surface 106. In addition to being combined into combined image data 332, markup data 330 is also stored as part of the history log 329 on the projector 102. In one embodiment, touch-sensitive tablets 104 include a display capability through touch-sensitive screen driver 346. In this embodiment, screen driver 346 is configured to receive a collaborative drawing/image 332 and display the image on the touch-sensitive screen 336.

In a particular embodiment of FIG. 3, display module 328 receives user markup data 330 (e.g., a drawing) from the touch-sensitive tablets 104. In this embodiment, a computer/input device 108 may be present but is not necessary, since no image data/file(s) 308 are received from a computer/input device 108. Thus, display module 328 may receive a first group of user markup data 330 (e.g., a drawing) from a first touch-sensitive tablet 104(1). Display module 328 is configured to project user markup data 330 onto public display surface 106. Display module 328 may receive a second group of user markup data 330 from a second touch-sensitive tablet 104(2). Display module 328 is configured to combine all markup data 330 and maintain a collaborative or combined drawing 332 that represents the latest input from all touch-sensitive tablets 104. Display module 328 projects the collaborative/combined drawing 332 onto public display surface 106.

In this embodiment, a user enters markup data by pressing a stylus 114 to a touch-sensitive tablet 104. A user knows where to enter marks based on the relative location of a cursor that appears on the projected drawing when the stylus 114 is pressed onto the touch-sensitive tablet 104. The cursor that appears on the projected drawing is different for each touch-sensitive tablet 104 so that different users know the relative positions of their respective cursors. Cursors may be distinguished in various ways, such as by color or by shape. Thus a user of a first touch-sensitive tablet 104(1) may understand that pressing the stylus 114(1) to the tablet 104(1) causes a red cursor to appear on the projected drawing, while a user of a second touch-sensitive tablet 104(2) understands that pressing the stylus 114(2) to the tablet 104(2) causes a green cursor to appear on the projected drawing. Likewise, variously shaped cursors may distinguish a first touch-sensitive tablet 104(1) and a second touch-sensitive tablet 104(2).

In addition, the markings entered by users from different touch-sensitive tablets 104 can be distinguishable on a projected drawing in various ways, such as color or line type. For example, markup data entered by a user of a first touch-sensitive tablet 104(1) may appear in the color red, while markup data entered by a user of a second touch-sensitive tablet 104(2) may appear in the color green. Likewise, markings may be distinguishable between various touch-sensitive tablets 104 based on the types of lines displayed for the marks. For example, markup data entered by a user of a first touch-sensitive tablet 104(1) may appear as solid lines, while markup data entered by a user of a second touch-sensitive tablet 104(2) may appear as dashed lines.

In this manner, users of touch-sensitive tablets 104 can develop drawings by continually providing markup data 330 that gets combined with the most recent version of a collaborative drawing 332 and projected onto a public display surface 106. Collaborative drawings 332 can be printed via printer driver 334 and a printer 110 (FIGS. 1 and 2), or sent to a computer 108 (if present) for storage, later review, and/or transmission to other similar computer devices.

In an alternative embodiment, touch-sensitive tablets 104 include a display capability. Thus, in addition to projecting markup data 330 onto public display surface 106 as a combined drawing 332, display module 328 is configured to send the combined drawing 332 out to all touch-sensitive tablets 104 so that it can be displayed on each tablet 104. In this embodiment, users can view projected drawings 332 on their touch-sensitive tablets 104 in addition to viewing them on public display surface 106. Entering markings 330 from touch-sensitive tablets 104 is accomplished in the same general manner as discussed above, except that the use of distinguishable cursors may not be as important since users understand relative marking positions by virtue of the drawing being displayed on their touch-sensitive tablets 104. That is, a user of a first touch-sensitive tablet 104(1) can readily see the relative marking position of stylus 114(1) on a drawing being displayed on the touch-sensitive tablet 104(1).

As mentioned above, history log 329 is configured to track incoming markup data 330 and keep a log of which touch-sensitive tablet 104 generates each mark stored in markup data 330. Tracking the markup data 300 from touch-sensitive tablets 104 enables a markup erasing function on projector 102. The control panel 319 includes one or more navigation buttons that permit stepping through each mark that has been stored as markup data 330 in history log 329. Each mark being projected onto public display screen 106 is highlighted, or denoted in some other manner, by projector 102 as a user cycles through the marks using navigation buttons on control panel 319. Control panel 319 also includes an erase button that, when selected, removes whichever mark is highlighted from the markup data 330. In this manner, projector 102 can be used to step through and remove any unwanted marks from markup data 330 and from the collaborative/combined image 332 being projected onto public display screen 106.

With respect to touch-sensitive tablets 104 having a display capability, history log 329 also enables an information retrieval function. Screen driver 346 on a tablet 104 is configured in this instance, to sense a stylus 114 that is depressed against touch-sensitive screen 336 for a given period of time, such as for 2 seconds. When a stylus 114 is depressed against the screen 336 in this manner over a mark being displayed on the screen 336, driver 346 sends a request to the projector 102 for identification information regarding the mark. The history log 329 is configured to find information about the mark and to send that information back to tablet 104 making the request. The information may include general identification information such as which tablet generated the mark, or more specific identification information about the user who generated the mark.

In another embodiment of FIG. 3, display module 328 receives an image 308 from a computer/input device 108. Display module 328 is configured to project an image 308 onto public display surface 106. Display module 328 may receive a first group of user markup data 330 from a first touch-sensitive tablet 104(1). Display module 328 is configured to project image 308 onto public display surface 106 along with user markup data 330 as a markup image 332. Display module 328 is configured to combine all markup data 330 received with image 308, and maintain an updated markup image 332 that represents the latest input from all touch-sensitive tablets 104. Display module 328 projects the most updated image 332 onto public display surface 106.

Entering markings (i.e., markup data 330) onto an image 308 from touch-sensitive tablets 104 is accomplished in the same general manner as discussed above with respect to entering markings onto drawings that originate from a touch-sensitive tablet 104. Thus, a user enters markup data 330 by pressing a stylus 114 to a touch-sensitive tablet 104. A user knows where to enter marks based on the relative location of a cursor that appears on the projected image 308 when the stylus 114 is pressed onto the touch-sensitive tablet 104. Cursors and markings are distinguishable through different colors and shapes, for example, as generally discussed above regarding a previous embodiment.

In yet another embodiment of FIG. 3, display module 328 again receives an image 308 from a computer/input device 108. In this embodiment, touch-sensitive tablets 104 include a display capability as discussed above. Thus, in addition to projecting an image 308 onto display surface 106, display module 328 is configured to send an image 308 (and marked up images 332) out to all touch-sensitive tablets 104 so that it can be displayed on each tablet 104. In this embodiment, users can view a projected image 308 on their touch-sensitive tablets 104 in addition to viewing them on public display surface 106. Entering markings from touch-sensitive tablets 104 is accomplished in the same general manner as discussed above. The use of distinguishable cursors may not be needed, however, since users understand relative marking positions by virtue of the image 308 being displayed on their touch-sensitive tablets 104. That is, a user of a first touch-sensitive tablet 104(1) can readily see the relative marking position of stylus 114(1) on an image 308 being displayed on the touch-sensitive tablet 104(1).

In accordance with the described embodiments, users of touch-sensitive tablets 104 can collaboratively mark up and develop drawings from scratch as well as collaboratively mark up and develop pre-existing images 308 by continually providing markup data 330 that gets combined by projector 102 with the most recent version of a collaborative markup drawing/image 332 and projected onto a display surface 106. Collaborative markup drawings/images 332 can be printed via printer driver 334 and a printer 110 (FIGS. 1 and 2), or sent to computer 108 for storage, later review, and/or transmission to other similar computer devices.

Exemplary Methods for Generating a Collaborative Markup Image and Drawing

Example methods for generating a collaborative markup image and drawing 332 with a collaborative markup projection system 100 as discussed above and illustrated in FIGS. 1–3 will now be described. The example methods will be described with primary reference to flow diagrams illustrated in FIGS. 4–7. The elements of the described methods may be performed by any appropriate means including, for example, by the execution of processor-readable instructions defined on a processor-readable media, such as a disk, a ROM or other such memory device.

Figure 4:
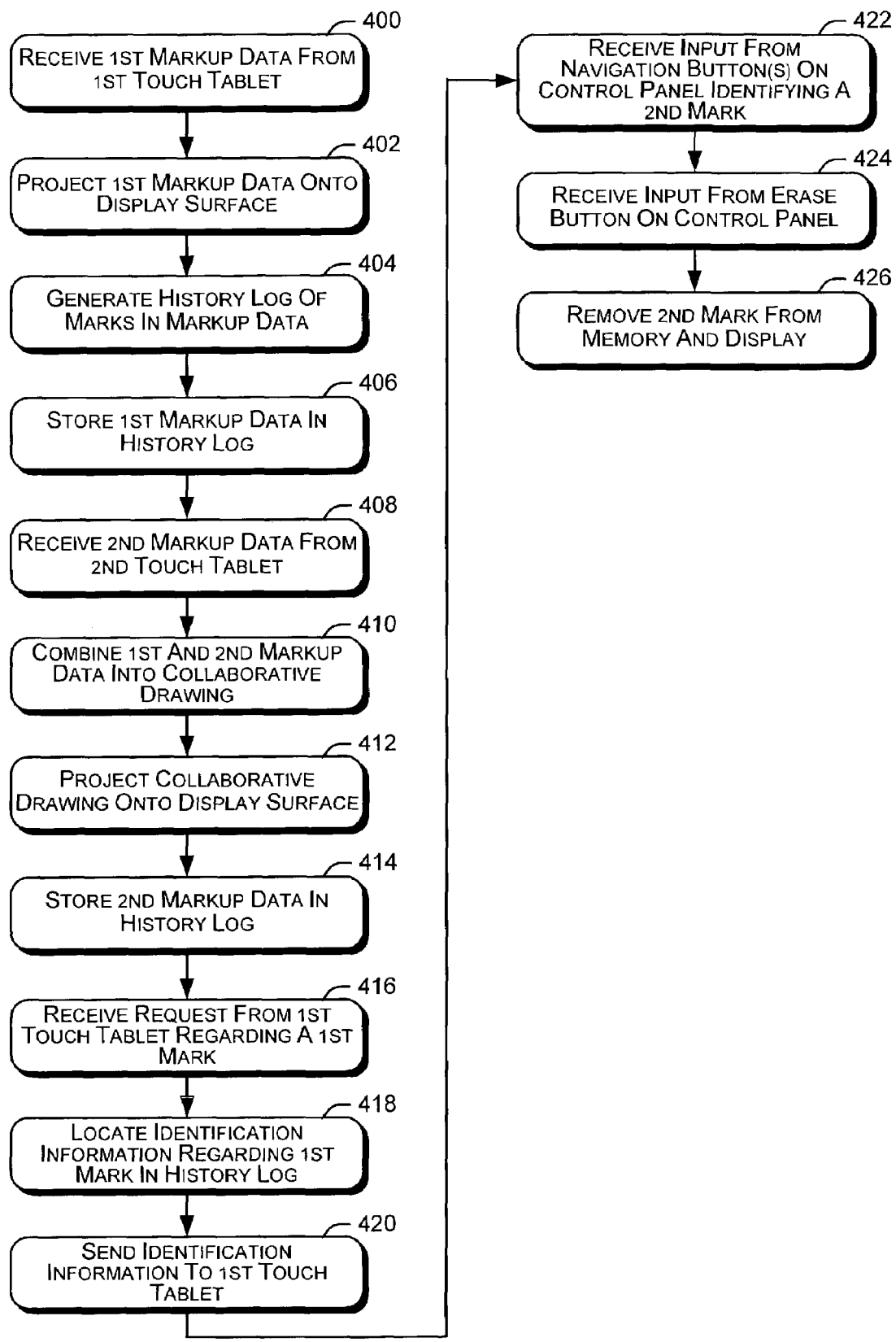
FIG. 4 is a flow diagram illustrating an example method of collaboratively developing a drawing with a collaborative markup projection system.

Referring to the method illustrated in FIG. 4, at block 400, a first set of markup data is received from a first touch tablet. The markup data is received by a projector and includes x-y coordinate data that defines markings entered by a user on the first touch tablet. The first markup data may be the beginning of a collaborative drawing. The first touch tablet is any one of a plurality of touch-sensitive tablets 104 coupled to the projector. At block 402, the first set of markup data is projected onto a public display surface. At block 404, a history log is generated containing information about marks contained in the markup data. At block 406, the first markup data is stored in the history log. At block 408, a second set of markup data is received from a second touch tablet. At block 410, the first and second sets of markup data are combined to form a collaborative drawing. At block 412, the collaborative drawing is projected onto the public display surface. The projector stores the second set of markup data in the history log, as shown in block 414.

Continuing with the method of FIG. 4, the projector receives a request for information from a first touch tablet regarding a mark, as shown in block 416. At block 418, the projector 102 locates identification information regarding the mark in the history log. At block 420, the projector sends the identification information to the first touch tablet. At block 422, the projector receives navigation input from one or more navigation buttons on a control panel of the projector. The navigation input steps the projector through marks stored in the history log and stops on a second mark to identify that mark. At block 424, the projector receives a selection input from an erase button on the control panel of the projector. Based on the selection of the erase button, at block 426, the projector removes the identified second mark from its memory and from its display mechanism so the second mark is no longer displayed on the display surface.

Figure 5:
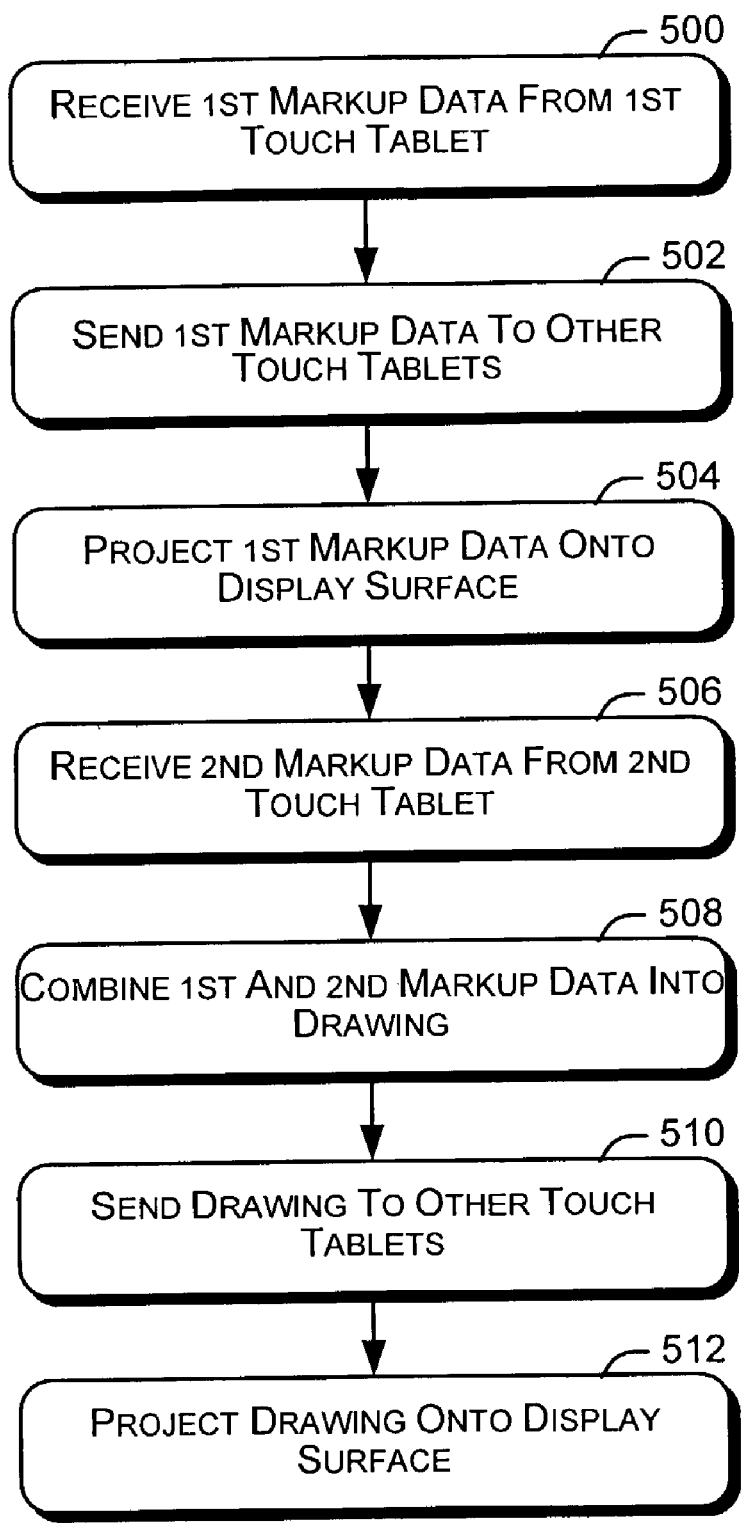
FIG. 5 is a flow diagram illustrating an alternative example method of collaboratively developing a drawing with a collaborative markup projection system.

Referring now to the method illustrated in FIG. 5, at block 500, a first set of markup data is received from a first touch tablet. The markup data is received by a projector and includes x-y coordinate data that defines markings entered by a user on the first touch tablet. The first markup data may be the beginning of a collaborative drawing. The first touch tablet is any one of a plurality of touch-sensitive tablets 104 coupled to the projector. At block 502, the first set of markup data is sent to each of the plurality of touch-sensitive tablets 104. At block 504, the first set of markup data is projected onto a public display surface. At block 506, a second set of markup data is received from a second touch tablet. At block 508, the first and second sets of markup data are combined to form a collaborative drawing. At block 510, the collaborative drawing is sent to each of the plurality of touch-sensitive tablets 104. At block 512, the collaborative drawing is projected onto a public display surface.

Figure 6:
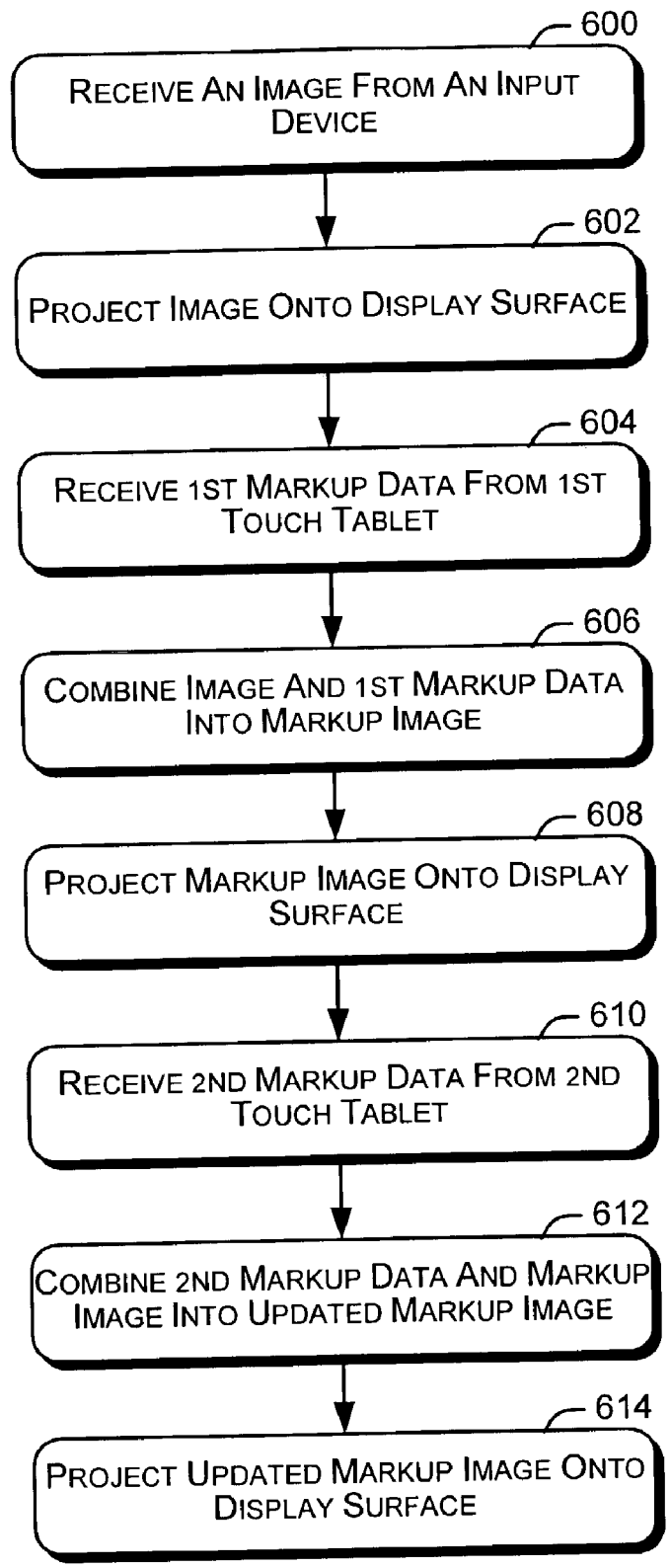
FIG. 6 is a flow diagram illustrating an example method of collaboratively marking up an image with a collaborative markup projection system.

Referring now to the method illustrated in FIG. 6, at block 600, an image (i.e., image data 308) is received by a projector from an input device such as a computer. At block 602, the image is projected onto a public display surface. At block 604, a first set of markup data is received from a first touch tablet. The markup data is received by the projector and includes x-y coordinate data that defines markings entered by a user on the first touch tablet. At block 606, the image and the first set of markup data are combined into a markup image. At block 608, the markup image is projected onto the public display surface. At block 610, a second set of markup data is received from a second touch tablet. At block 612, the markup image and the second set of markup data are combined into an updated markup image. At block 614, the updated markup image is projected onto the public display surface.

Figure 7:
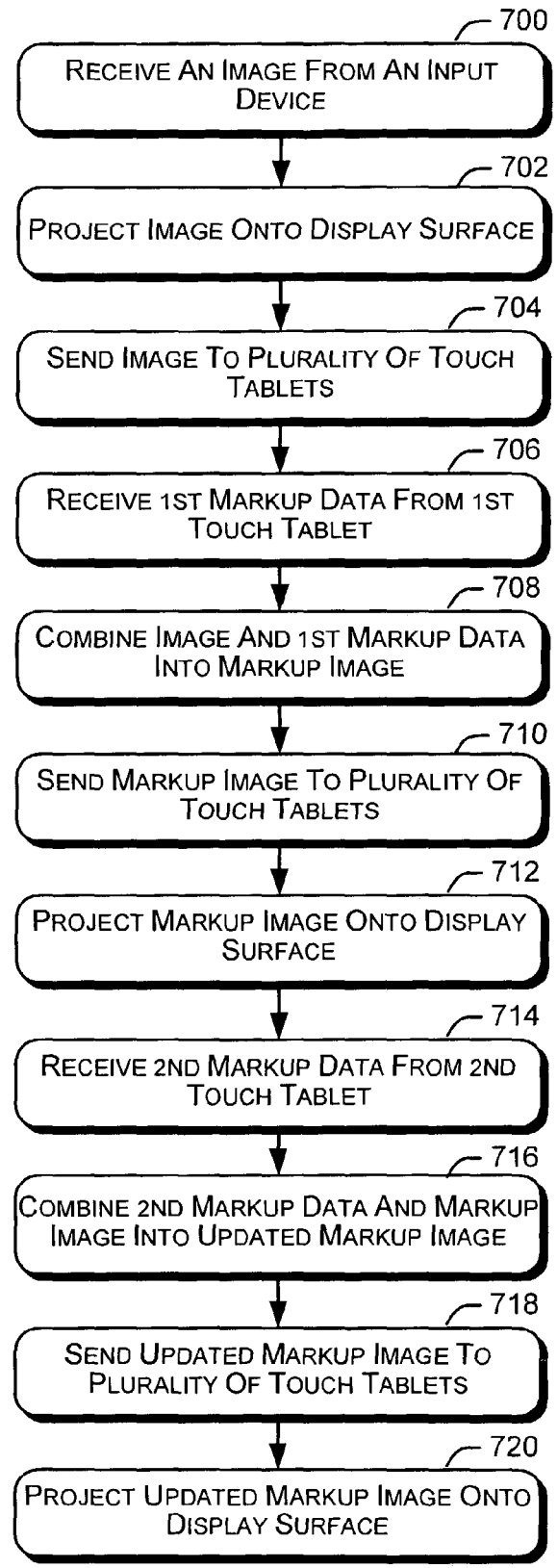
FIG. 7 is a flow diagram illustrating an alternative example method of collaboratively marking up an image with a collaborative markup projection system.

Referring now to the method illustrated in FIG. 7, at block 700, an image (i.e., image data 308) is received by a projector from an input device such as a computer. At block 702, the image is projected onto a public display surface. At block 704, the image is sent to a plurality of touch-sensitive tablets 104 coupled to the projector. At block 706, a first set of markup data is received from a first touch tablet. The markup data is received by the projector and includes x-y coordinate data that defines markings entered by a user on the first touch tablet. At block 708, the image and the first set of markup data are combined into a markup image. At block 710, the markup image is sent to the plurality of touch-sensitive tablets 104 coupled to the projector. At block 712, the markup image is projected onto the public display surface. At block 714, a second set of markup data is received from a second touch tablet. At block 716, the markup image and the second set of markup data are combined into an updated markup image. At block 718, the updated markup image is sent to the plurality of touch-sensitive tablets 104 coupled to the projector. At block 720, the updated markup image is projected onto the public display surface.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

Additionally, while one or more methods have been disclosed by means of flow diagrams and text associated with the blocks of the flow diagrams, it is to be understood that the blocks do not necessarily have to be performed in the order in which they were presented, and that an alternative order may result in similar advantages.

The invention claimed is:

1. A processor-readable medium comprising processor-executable instructions configured for:
   generating a history log regarding marks in first markup data received from a first touch tablet;
   storing the first markup data in the history log;
   receiving a request regarding a particular mark from the first touch tablet;
   locating identification information for the particular mark in the history log; and
   sending the identification information to the first touch tablet.

2. A processor-readable medium as recited in claim 1, comprising further processor-executable instructions configured for:
   receiving navigation information from a control panel identifying the particular mark in the history log;
   receiving selection information from an erase button on the control panel; and
   removing the particular mark from the history log.

3. A processor-readable medium as recited in claim 1 wherein the first markup data comprise x-y coordinate data entered through a touch-sensitive screen of the first touch tablet.

4. A processor-readable medium as recited in claim 3, wherein the x-y coordinate data is at a resolution of the touch-sensitive screen.

5. A processor-readable medium as recited in claim 1 wherein the projecting further comprises:
   receiving the first markup data from the first touch tablet;
   projecting the first markup data onto a public display surface;
   receiving second markup data from a second touch tablet;
   combining the first markup data and the second markup data into a drawing; and
   projecting the drawing onto the public display surface;
   forming an image onto an LCD (liquid crystal display) panel;
   illuminating the LCD panel; and
   magnifying the image through a lens.

6. A processor-readable medium as recited in claim 5 wherein the first touch tablet and the second touch tablet are the same touch tablet.

7. A processor-readable medium as recited in claim 5 wherein the projecting the first markup data further comprises:
   displaying a cursor associated with the first touch tablet, wherein the cursor is associated with the first touch tablet through factors selected from the group of factors comprising:
   a cursor color; and
   a cursor shape.

8. A processor-readable medium as recited in claim 5 wherein the projecting the first markup data further comprises:
   associating the first markup data with the first touch tablet through factors selected from the group of factors comprising:
   a color of the first markup data; and
   a line type of the first markup data.

9. A processor-readable medium comprising processor-executable instructions configured for:
   receiving first markup data from a first touch tablet;
   generating a history log regarding marks in the first markup data received from the first touch tablet;
   storing the first markup data in the history log;
   receiving a request regarding a particular mark from the first touch tablet;
   locating identification information for the particular mark in the history log;
   sending the identification information to the first touch tablet;
   sending the first markup data to a plurality of touch tablets;
   projecting the first markup data onto a public display surface;
   receiving second markup data from a second touch tablet;
   combining the first markup data and the second markup data into a drawing;
   sending the drawing to the plurality of touch tablets; and
   projecting the drawing onto the public display surface.

10. A processor-readable medium as recited in claim 9, wherein each of the plurality of touch tablets is configured to display the first markup data and the drawing on a touch-sensitive screen.

11. A processor-readable medium comprising processor-executable instructions configured for:
    receiving an image from an input device;
    projecting the image onto a public display surface;
    receiving first markup data from a first touch tablet;
    generating a history log regarding marks in the first markup data received from the first touch tablet;
    storing the first markup data in the history log;
    receiving a request regarding a particular mark from the first touch tablet;
    locating identification information for the particular mark in the history log;
    sending the identification information to the first touch tablet;
    combining the first markup data with the image to form a markup image;
    projecting the markup image onto the public display surface; and
    sending the markup image to the first touch tablet.

12. A processor-readable medium as recited in claim 11, comprising further processor-executable instructions configured for:
    receiving second markup data from a second touch tablet;
    combining the second markup data with the markup image to form an updated markup image; and
    projecting the updated markup image onto the public display surface.

13. A processor-readable medium as recited in claim 11, wherein the input device is a device selected from a group of devices comprising:
    a computer;
    a camera;
    a DVD (digital video disc) player;
    a digital television tuner; and
    a video cassette recorder.

14. A processor-readable medium comprising processor-executable instructions configured for:
    receiving an image from an in put device;
    projecting the image onto a public display surface;
    sending the image to a plurality of touch tablets;
    receiving first markup data from a first touch tablet;
    generating a history log regarding marks in the first markup data received from the first touch tablet;
    storing the first markup data in the history log;

receiving a request regarding a particular mark from the first touch tablet;
locating identification information for the particular mark in the history log;
sending the identification information to the first touch tablet;
combining the first markup data with the image to form a markup image; sending the markup image to the plurality of touch tablets; and
projecting the markup image onto the public display surface.

15. A processor-readable medium as recited in claim 14, comprising further processor-executable instructions configured for:
receiving second markup data from a second touch tablet;
combining the second markup data with the markup image to form an updated markup image;
sending the updated markup image to the plurality of touch tablets; and
projecting the updated markup image onto the public display surface.

16. A processor-readable medium as recited in claim 14, wherein each of the plurality of touch tablets is configured to display the image and the markup image on a touch-sensitive screen.

17. A processor-readable medium comprising processor-executable instructions configured for:
receiving an image from a projector;
displaying the image on a touch-sensitive screen;
receiving first x-y coordinate markup data from the touch-sensitive screen;
generating a history log regarding marks in the first x-y coordinate markup data received from the touch-sensitive screen;
storing the first x-y coordinate markup data in the history log;
receiving a request regarding a particular mark from the touch-sensitive screen;
locating identification information for the particular mark in the history log;
sending the identification information to the touch-sensitive screen;
sending the first x-y coordinate markup data to the projector;
receiving a markup image from the projector, the markup image including the image and the first x-y coordinate markup data combined; and
displaying the markup image on the touch-sensitive screen.

18. A processor-readable medium as recited in claim 17, comprising further processor-executable instructions configured for:
receiving second x-y coordinate markup data from the touch-sensitive screen;
sending the second x-y coordinate markup data to the projector;
receiving an updated markup image from the projector, the updated markup image including the markup image and the second x-y coordinate markup data combined; and
displaying the updated markup image on the touch-sensitive screen.

19. A method of collaboratively developing a drawing from scratch comprising:
receiving first markup data from a first touch tablet;
generating a history log regarding marks in the first markup data received from the first touch tablet;
storing the first markup data in the history log;
receiving a request regarding a particular mark from the first touch tablet;
locating identification information for the particular mark in the history log;
sending the identification information to the first touch tablet;
projecting the first markup data onto a public display surface;
receiving second markup data from a second touch tablet;
combining the first markup data and the second markup data into a drawing;
projecting the drawing onto the public display surface; and
sending the drawing to the first touch tablet.

20. A method of collaboratively developing a drawing from scratch comprising:
receiving first markup data from a first touch tablet;
generating a history log regarding marks in the first markup data received from the first touch tablet;
storing the first markup data in the history log;
receiving a request regarding a particular mark from the first touch tablet;
locating identification information for the particular mark in the history log;
sending the identification information to the first touch tablet;
sending the first markup data to a plurality of touch tablets;
projecting the first markup data onto a public display surface;
receiving second markup data from a second touch tablet;
combining the first markup data and the second markup data into a drawing;
sending the drawing to the plurality of touch tablets; and
projecting the drawing onto the public display surface.

21. A method of collaboratively marking up an image comprising:
receiving an image from an input device;
projecting the image onto a public display surface;
receiving first markup data from a first touch tablet;
generating a history log regarding marks in the first markup data received from the first touch tablet;
storing the first markup data in the history log;
receiving a request regarding a particular mark from the first touch tablet;
locating identification information for the particular mark in the history log;
sending the identification information to the first touch tablet;
combining the first markup data with the image to form a markup image;
projecting the markup image onto the public display surface;
receiving second markup data from a second touch tablet;
combining the second markup data with the markup image to form an updated markup image;
projecting the updated markup image onto the public display surface; and
sending the updated markup image to at least one of the first touch tablet and the second touch tablet.

22. A method of collaboratively marking up an image comprising:
receiving an image from an input device;
projecting the image onto a public display surface;
sending the image to a plurality of touch tablets;
receiving first markup data from a first touch tablet;

generating a history log regarding marks in the first markup data received from the first touch tablet;

storing the first markup data in the history log;

receiving a request regarding a particular mark from the first touch tablet;

locating identification information for the particular mark in the history log;

sending the identification information to the first touch tablet;

combining the first markup data with the image to form a markup image;

sending the markup image to the plurality of touch tablets;

projecting the markup image onto the public display surface;

receiving second markup data from a second touch tablet;

combining the second markup data with the markup image to form an updated markup image;

sending the updated markup image to the plurality of touch tablets; and projecting the updated markup image onto the public display surface.

23. A method of collaboratively marking up an image comprising:

receiving an image from a projector;

displaying the image on a touch-sensitive screen;

receiving first x-y coordinate markup data from the touch-sensitive screen;

generating a history log regarding marks in the first x-y coordinate markup data received from the touch-sensitive screen;

storing the first x-y coordinate markup data in the history log;

receiving a request regarding a particular mark from the touch-sensitive screen;

locating identification information for the particular mark in the history log;

sending the identification information to the touch-sensitive screen;

sending the first x-y coordinate markup data to the projector;

receiving a markup image from the projector, the markup image including the image and the first x-y coordinate markup data combined; and displaying the markup image on the touch-sensitive screen.

* * * * *